US006602562B2

(12) United States Patent
Nakajima et al.

(10) Patent No.: US 6,602,562 B2
(45) Date of Patent: Aug. 5, 2003

(54) ELECTRO-OPTICAL LIQUID-CRYSTAL DISPLAY

(75) Inventors: Shinji Nakajima, Atsugi (JP); Hideo Ichinose, Odawara (JP); Akiko Takashima, Aiko-gun (JP); Yasushi Sugiyama, Atsugi (JP)

(73) Assignee: Merck Patent Gesellschaft mit, Darmstadt (DE)

( * ) Notice: Subject to any disclaimer, the term of this patent is extended or adjusted under 35 U.S.C. 154(b) by 0 days.

(21) Appl. No.: 09/560,136

(22) Filed: Apr. 28, 2000

(65) Prior Publication Data

US 2003/0113482 A1 Jun. 19, 2003

(30) Foreign Application Priority Data

Apr. 30, 1999 (DE) .......................... 199 19 978

(51) Int. Cl.[7] .................. C09K 19/30; C09K 19/12; C09K 19/20
(52) U.S. Cl. .............. 428/1.1; 252/299.63; 252/299.66; 252/299.67
(58) Field of Search ................... 252/299.01, 299.63, 252/299.66, 299.67; 428/1.1

(56) References Cited

U.S. PATENT DOCUMENTS

| | | | |
|---|---|---|---|
| 4,455,261 A | | 6/1984 | Sasaki et al. |
| 5,993,691 A | * | 11/1999 | Pausch et al. .......... 252/299.63 |
| 6,028,655 A | * | 2/2000 | Weber et al. ............... 349/182 |
| 6,056,894 A | * | 5/2000 | Hirschmann et al. .. 252/299.63 |
| 6,080,451 A | * | 6/2000 | Hirschmann et al. ......... 428/1.1 |
| 6,146,720 A | * | 11/2000 | Pausch et al. ................ 428/1.1 |
| 6,183,821 B1 | * | 2/2001 | Hirschmann et al. ........ 428/1.1 |
| 6,440,506 B1 | * | 8/2002 | Kojima et al. ............... 428/1.1 |

FOREIGN PATENT DOCUMENTS

| | | | |
|---|---|---|---|
| DE | 19611096 | * | 9/1997 |
| DE | 199 50 194 | | 5/2000 |
| EP | 0 019 665 | | 5/1987 |
| EP | 0 588 568 | | 3/1994 |
| WO | WO 91/10936 | | 7/1991 |

OTHER PUBLICATIONS

R.A. Soref, "Field effects in nematic liquid crystals obtained with interdigital electrodes" *Journal of Applied Physics*, vol. 45, No. 12, Dec. 1974, pp. 5466–5468.

* cited by examiner

Primary Examiner—Shean C. Wu
(74) Attorney, Agent, or Firm—Millen White Zelano & Branigan

(57) ABSTRACT

The invention generally relates to an electro-optical liquid-crystal display having a re-alignment layer, for re-aligning the liquid crystals, whose field has a component parallel to the liquid-crystal layer which is desirable for the re-alignment, including a liquid-crystalline medium of positive dielectric anisotropy, where the medium can include one or more compounds of the formula I and one or more compounds selected from the group of compounds of the formulae II and III

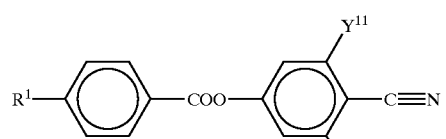

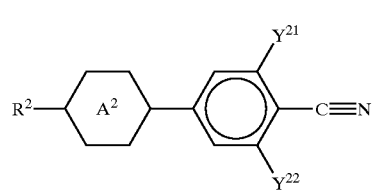

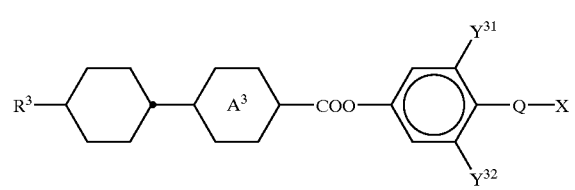

in which
$R^1$, $R^2$ and $R^3$ are each, independent of one another, alkyl or alkoxy having 1 to 7 carbon atoms or alkenyl, alkenyloxy or alkoxyalkyl having 2 to 7 carbon atoms,
$Y^{11}$, $Y^{12}$, $Y^{21}$, $Y^{22}$,
$Y^{31}$ and $Y^{32}$ are each, independent of one another, H or F,

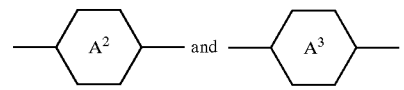

are each, independent of one another,

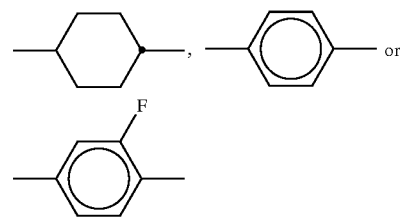

and Q—X is F, Cl, —$OCF_2H$ or —$OCF_3$.

34 Claims, No Drawings

ELECTRO-OPTICAL LIQUID-CRYSTAL DISPLAY

FIELD OF THE INVENTION

The invention relates to electro-optical liquid-crystal displays, and more particularly, mediums for such displays.

BACKGROUND OF THE INVENTION

In conventional liquid-crystal displays (TN, STN, OMI AMD-TN), the electric fields for the re-alignment are generated essentially perpendicular to the liquid-crystal layer.

International Patent Application WO 91/10936 discloses a liquid-crystal display in which the electric fields have a significant component parallel to the liquid-crystal layer (IPS, in-plane switching). The principles of operation of a display of this type are described, for example, by R. A. Soref in Journal of Applied Physics, Vol. 45, No. 12, pp. 5466–5468 (1974).

For example, EP 0 588 568 discloses various possibilities for designing the electrodes and for addressing a display of this type.

Compounds of the formula

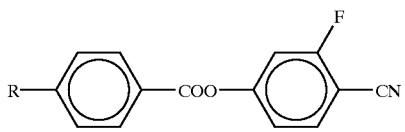

in which R=alkyl are disclosed in EP 0 019 665 and U.S. Pat. No. 4,455,261.

However, there is no indication therein that the properties of IPS displays can be improved with the aid of these substances.

IPS displays containing liquid-crystal media including a compound of the formula

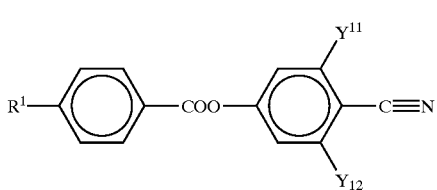

and compounds of the formula

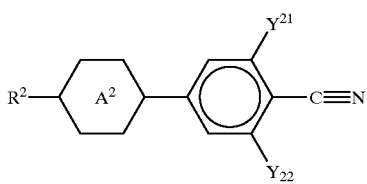

have already been mentioned in DE 198 48 181. However, the liquid-crystal media achieved therein have only inadequate dielectric anisotropy values and excessively low clearing point values.

These IPS displays can be operated with liquid-crystalline materials of either positive or negative dielectric anisotropy ($\Delta\epsilon \neq 0$). However, the materials disclosed hitherto generally give not only poor low-temperature storage stabilities and long response times in IPS displays, but in addition the liquid-crystalline materials have excessively high birefringence values, inadequate voltage holding ratios and, in particular, excessively low clearing point values and very particularly excessively low dielectric anisotropy values.

In particular the combination of high dielectric anisotropy, for achieving a relatively low threshold, with a high clearing point was desirably needed without severe impact on the voltage holding ratio, the low-temperature stability and the response time.

SUMMARY OF THE INVENTION

As used herein, the terms "include" or "have" mean to take in, enfold, or comprise as a discrete or subordinate part or item of a larger aggregate, group or principle.

Surprisingly, this feature has been achieved by using liquid-crystalline materials which can include at least two compounds of the formula I, at least one compound of the formula II and/or at least one compound of the formula III and/or IV.

The IPS mixtures according to the invention can improve over the prior art by their relatively high clearing points and low rotational viscosity values and their increased stability to crystallization at low temperatures.

The invention thus generally relates to an electro-optical liquid-crystal display having a re-alignment layer, for re-aligning the liquid crystals, including a field having a significant component parallel to the liquid-crystal layer, including a liquid-crystalline medium of positive dielectric anisotropy, where the medium includes one or more compounds of the formula I and one or more compounds selected from the group of compounds of the formulae II and III

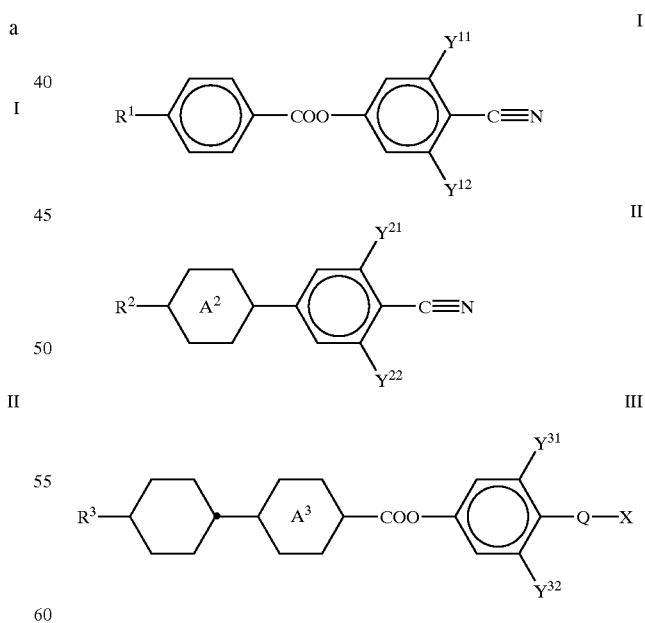

in which
$R^1$, $R^2$
and $R^3$ are each, independent of one another,
alkyl or alkoxy having 1 to 7 carbon atoms or alkenyl, alkenyloxy or alkoxyalkyl having 2 to 7 carbon atoms, $Y^{11}$, $Y^{12}$, $Y^{21}$ $Y^{22}$, $Y^{31}$ and $Y^{32}$ are each, independent of one another, H or F,

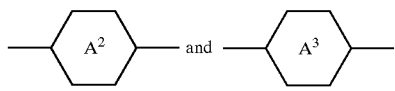

are each, independent of one another,

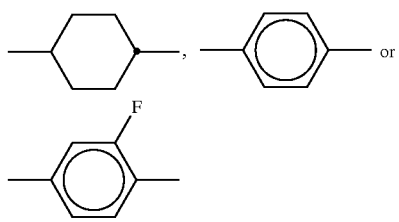

and

Q—X is F, Cl, —OCF$_2$H or —OCF$_3$.

$R^1$ is particularly preferably ethyl, n-propyl and/or n-butyl.

The liquid-crystalline medium preferably includes two or more, particularly preferably three, four or more, most preferably three, compounds of the formula Ia

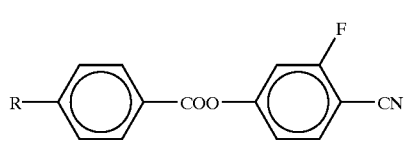

Ia which $R^1$ is as defined under the formula I and is preferably ethyl, n-propyl, n-butyl or n-pentyl, particularly preferably ethyl, n-propyl or n-pentyl.

In addition to the compounds of the formula Ia, the medium preferably includes one or more compounds selected from the group of compounds of the formulae IIa to IIc

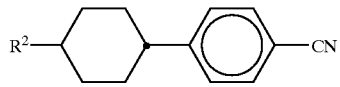

IIa

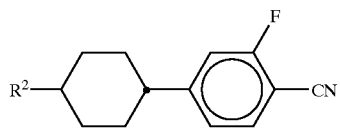

IIb

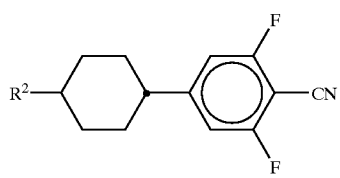

IIc particularly preferably one or more compounds of the formula Ia, very particularly preferably one or more compounds of the formula IIc, in which $R^2$ is as defined above under the formula II, and particularly preferably in each case one or more compounds of the formulae Ia and IIc and/or one or more compounds from the group of the formulae IIIa to IIII

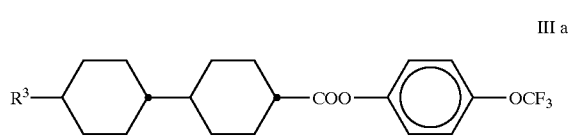

IIIa

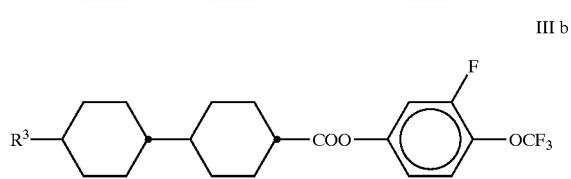

IIIb

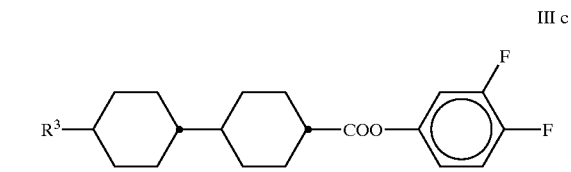

IIIc

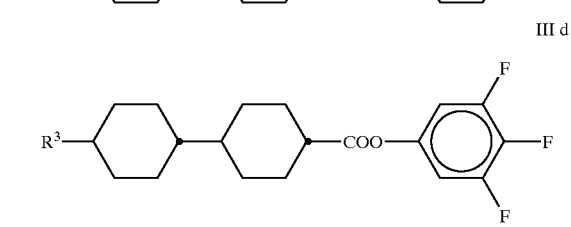

IIId

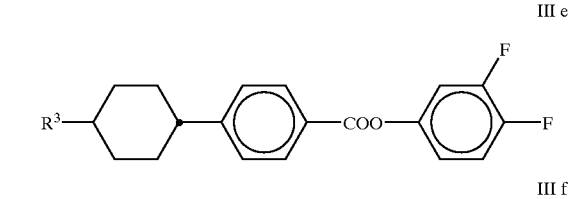

IIIe

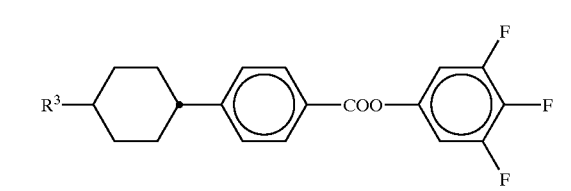

IIIf

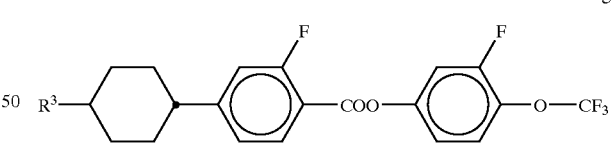

IIIg

IIIh

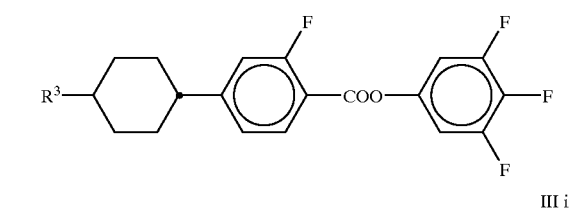

IIIi

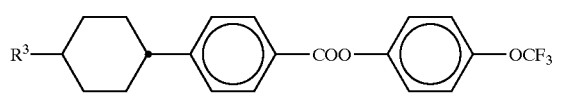

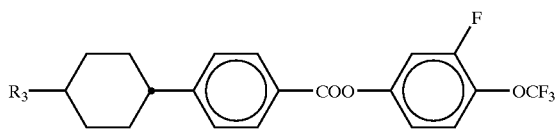

IIIj

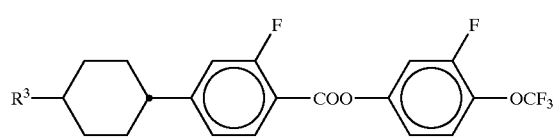

IIIk

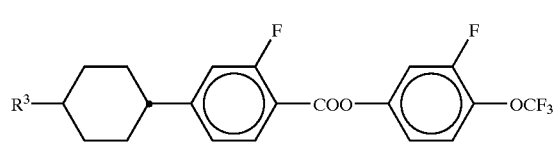

IIIl in which $R^3$ is as defined above for $R^1$ under the formula I and is preferably ethyl, n-propyl, n-butyl or n-pentyl, particularly preferably ethyl, n-propyl or n-pentyl.

Preference is given to liquid-crystal displays having liquid-crystalline media including one or more compounds of the formula IV

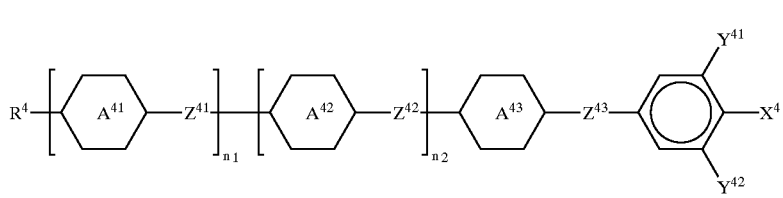

IV in which
$R^4$ is H, an alkyl or alkenyl radical having 1 to 15 carbon atoms which is monosubstituted by CN or $CF_3$ or at least monosubstituted by halogen, preferably by F, where, in addition, one or more $CH_2$ groups in these radicals may each, independently of one another, be replaced by —O—, —S—,

—CO—, —CO—, —O—CO—, —O—CO—O— or —C≡C— in such a way that O atoms are not linked directly to one another, $A^{41}$, $A^{42}$ and $A^{43}$ are each, independent of one another,
(a) a trans-1,4-cyclohexylene radical, in which, in addition, one or more non-adjacent $CH_2$ groups may be replaced by —O— and/or —S—,
(b) a 1,4-phenylene radical, in which, in addition, one or two CH groups may be replaced by N,
(c) a radical from the group consisting of 1,4-cyclohexenylene, 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl, where the radicals (a) and (b) may be substituted by one or two fluorine atoms, $Z^{41}$, $Z^{42}$ and $Z^{43}$ are each, independent of one another, —CO—O—, —O—CO—, —$CH_2$O—, —O$CH_2$—, —$CH_2CH_2$—, —CH=CH—, —C≡C— or a single bond, or one of the radicals $Z^{41}$ and $Z^{42}$ is alternatively —$(CH_2)_4$— or —CH=CH—$CH_2CH_2$—, $X^4$ is F, —$OCF_2H$ or —$OCF_3$, preferably F or —$OCF_3$, $Y^{41}$ and $Y^{42}$ are each, independent of one another, H or F, and $n_1$ and $n_2$ are each, independent of one another, 0 or 1.

In a preferred embodiment, the liquid-crystal displays contain liquid-crystalline media comprising three or more compounds of the formula I, particularly preferably in which $R^1$ is ethyl, n-propyl or n-butyl, and one or more compounds of the formula IVa and one or more, preferably two or more, compounds of the formula IIId

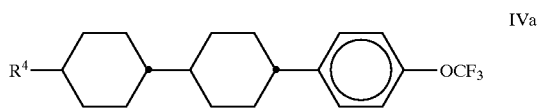

IVa

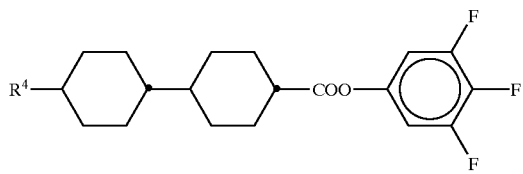

IIId in which $R^4$ is in each case as defined above under the formulae IVa and IIId, but is preferably ethyl, n-propyl, n-butyl or n-pentyl, particularly preferably ethyl or n-propyl.

In another preferred embodiment, the liquid-crystal display can include a liquid-crystal medium which predominantly, virtually exclusively or exclusively includes, as dielectrically positive compounds, i.e. as compounds having a Δε of greater than about +1.5, determined by extrapolation from the data of a mixture of about 15% of the substance in the mixture ZLI-4792 from Merck KGaA, compounds of the formulae I, II and III. In this application, "predominantly" means that the proportion of corresponding other compounds (here, for example, other compounds having Δε> about +1.5) in the mixture as a whole is less than about 10%, "virtually exclusively" means that this proportion is less than about 5%, and "exclusively" means that this proportion is less than about 1%. The liquid-crystal displays very particularly preferably can include absolutely no compounds having Δε> about 1.5 other than those of the formulae I, II and III.

In this embodiment, the liquid-crystal mixtures can include
- preferably two, three or four, particularly preferably three, compounds of the formula I, particularly preferably of the formula Ia, and
- two, three or four, particularly preferably two or three, compounds of the formula II, preferably one or more compounds of the formula Ia and one or more compounds of the formula IIc and
- one or more, preferably two or more, compounds of the formula III, particularly preferably of the formula IIIa.

Preference is furthermore given to liquid-crystal displays in which the liquid-crystalline medium can include one or more compounds of the formula V

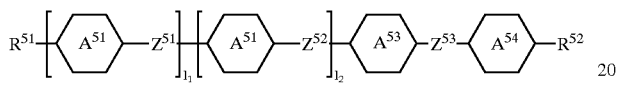

V in which
$R^{51}$ and $R^{52}$ are each, independent of one another, having the meaning of $R^4$ as described above in formula IV,
$A^{51}$, $A^{52}$, $A^{53}$ and $A^{54}$ each, independent from one another, has the meaning of $A^{41}$ under formula IV above,
$Z^{51}$, $Z^{52}$ and $Z^{53}$ each, independent from one another, has the meaning of $Z^{41}$ under formula IV above
$l_1$, and $l_2$ are each 0 or 1,
and preferably
$l_1+l_2$ is 0 or 1.

In a preferred embodiment, the liquid-crystal displays generally include liquid-crystal mixtures including one or more compounds of the formula IId

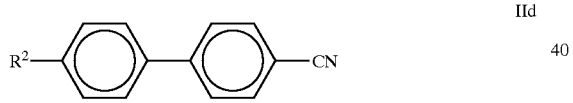

IId in which $R^2$ is as defined above under the formula II and is preferably n-alkyl having 2 to carbon atoms, in particular ethyl, propyl and/or butyl.

The liquid-crystal displays preferably include liquid-crystal mixtures having
- one or more compounds of the formula IIa in which $Y^{21}=Y^{22}=H$,
- one or more compounds of the formula Ia in which $Y^{21}=Y^{22}=F$,
- both one or more compounds of the formula IIa in which $Y^{21}=Y^{22}=F$ and one or more compounds of the formula IIa in which $Y^{21}=Y^{22}=H$,
- one or more compounds of the formula IIb in which $Y^{21}H$ and $Y^{22}=F$.
- one or more compounds of the formula IIa in which $Y^{21}=Y^{22}=H$ and $X=OCF_3$,
- one or more compounds of the formula IIIb in which $Y^{21}=H$, $Y^{22}$ is H or F, and $Y=F$.

Preferred embodiments are furthermore IPS displays in which
- the medium can additionally include one or more compounds selected from the group consisting of the compounds of the formulae Va and Vb

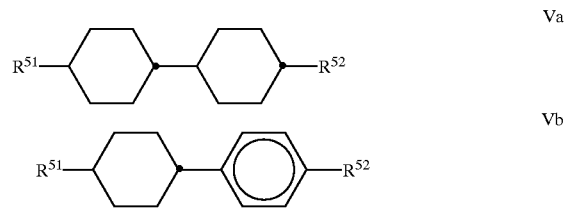

in which
$R^{51}$ and $R^{52}$ are each, independent of one another, alkyl or alkoxy having 1 to 7 carbon atoms or alkenyl, alkenyloxy or alkoxyalkyl having 2 to 7 carbon atoms, $R^{51}$ preferably being alkyl, particularly preferably having 1 to 5 carbon atoms, $R^{52}$ preferably being alkyl or alkoxy, preferably alkoxy having 1 to 3 carbon atoms, and/or from the group of the formula Vc

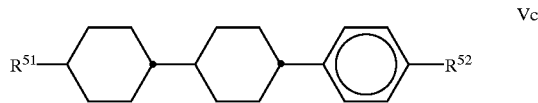

in which
$R^{51}$ and $R^{52}$ independent of one another, are as defined above for $R^5$ and $R^{52}$ respectively under the formula Va,
$R^{52}$ preferably being n-alkyl having 3 to 5 carbon atoms, and $R^{51}$ preferably being 1E-alkenyl.

The liquid-crystal displays preferably have liquid-crystal mixtures including
- one or more, particularly preferably two or more, compounds of the formula Va in which, preferably, at least one of the groups $R^{51}$ and $R^{52}$ is alkenyl, preferably 1E-alkenyl, particularly preferably vinyl or 1E-propenyl,
- one or more compounds of the formula Vb in which, preferably,
  $R^{51}$ is n-alkyl having 3 to 5 carbon atoms, particularly preferably having 3 or 5 carbon atoms, in particular having 3 carbon atoms, and
  $R^{52}$ is alkoxy having 1 to 3 carbon atoms, particularly preferably having 2 carbon atoms, and
- one or more, preferably two or more, compounds of the formula Vc in which
  $R^{52}$ is n-alkyl having 1 to 5 carbon atoms, preferably having 1 to 3 carbon atoms, and
  $R^{51}$ is 1E-alkenyl having 2 to 5 carbon atoms, preferably having 2 to 3 carbon atoms.

Preference can be furthermore given to an IPS display in which the pixels are addressed by means of an active matrix.

The invention furthermore relates to a liquid-crystalline medium of positive dielectric anisotropy which comprises at least one, particularly preferably at least three, compounds of the formula I and at least one compound selected from the group consisting of the compounds of the formulae IIa to IIIb, and at least one compound selected from the group consisting of the compounds of the formulae IVa and IIId, and at least one compound selected from the group consisting of the compounds of the formulae Va to Vc, in particular which comprises
- from about 5–about 30, preferably from about 8–about 20, in particular from about 11–about 17, or alternatively, about 3–about 35% by weight of at least one compound of the formula I, from about 5–about 40, preferably from about 15–about 30, or alternatively, about 2–about 45% by weight of at least one compound of the formula II, preferably of the formulae Ia to IIc, from 0–about 20, preferably from about 5–about 15, or alternatively, 0–about 25% by weight of at least one compound of the formula III, preferably of the formula IIIa, from 0 to 30, preferably from 0 to 25, % by weight of at least one compound of the formulae III and IV, preferably selected from the group consisting of the compounds of the formulae IVa and IIId, from about 10 to about 70, preferably from about 30–about 60, or alternatively about 7–about 75% by weight of at least one compound of the formula V, preferably selected from the group of compounds of the formulae Va to Vc, of these preferably from about 30–about 60% by weight, particularly preferably from about 30–about 55% by weight, based on the mixture as a whole, of compounds selected from the group of compounds of the formulae Va and Vb.

In particular here, but also throughout the application, all sub-combinations of the preferred ranges are desirable.

The liquid-crystal displays according to the invention preferably include a liquid-crystalline medium having:

at least two, preferably three, compounds of the preferred formula Ia

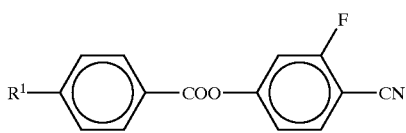

in which
R¹ is as defined above under the formula I, preferably n-alkyl.

In a further preferred embodiment, the displays according to the invention include media having one or more compounds of the formula Ia and one or more compounds of the formula IIa and one or more compounds of the formula IIc.

The liquid-crystalline media used in accordance with the invention generally have a birefringence ($\Delta n$) of <about 0.12, preferably in the range from about 0.05 to about 0.11, in particular in the range from about 0.07 to about 0.10, very particularly in the range from about 0.08 to about 0.095.

The flow viscosity (at 20° C.) of the mixtures used in accordance with the invention is generally less than about 30 mm²·s⁻¹, in particular from about 15 to about 25 mm²·s⁻¹.

The specific resistance of the materials according to the invention at 20° C. is generally from about $5 \times 10^{10}$ to about $5 \times 10^{10}$ $\Omega \cdot$cm, particularly preferably from about $5 \times 10^{11}$ to about $5 \times 10^{12}$ $\Omega \cdot$cm. The rotational viscosity of the mixtures according to the invention at 20° C. is generally less than about 100 mPa·s, in particular from about 50 to about 85 mPa·s.

Media having clearing points of from about 70 to about 80° C. used in accordance with the invention have rotational viscosities of about 120 mPa·s or less, preferably from about 80 to about 110 mPa·s.

The clearing point of the media used in accordance with the invention is above about 60° C, preferably at least about 70° C. and particularly preferably above about 70° C. and up to about 90° C. In particular, the clearing point is in the range from about 70° C. to about 80° C. The storage stability in test cells, determined as described below, is about 1000 hours or more at about −30° C., preferably about 500 hours or more at about −40° C. and very particularly preferably about 1000 hours or more at about −40° C.

The liquid-crystal media according to the invention have dielectric anisotropy values of greater than about 6.5. $\Delta \epsilon$ is preferably in the range from about 7 to about 25, particularly preferably in the range from about 9 to about 12, especially preferably in the range from about 10 to about 20, very particularly in the range from about 11 to about 13.

The media used in accordance with the invention can include of from about 5 to about 40 compounds, preferably from about 6 to about 20 compounds, particularly preferably from about 9 to about 16 compounds, and most preferably from about 11 to about 14 compounds.

It has been found that even a relatively small proportion of compounds of the formula I mixed with conventional liquid-crystal materials, but in particular with one or more compounds selected from the group consisting of the compounds of the formulae IIa to IIIb and/or from the group consisting of the compounds of the formulae IIId, IVa, Va and Vb, results in a significant reduction in the threshold voltage, in favourable values for the rotational viscosity $\gamma_1$ and in fast response times, in particular broad nematic phases having low smectic-nematic transition temperatures being observed. The compounds of the formulae I to IV are colourless, stable and readily miscible with one another and with other liquid-crystal materials.

The term "alkyl" can include straight-chain and branched alkyl groups having 1–7 carbon atoms, in particular the straight-chain groups methyl, ethyl, propyl, butyl, pentyl, hexyl and heptyl. Groups having 2–5 carbon atoms are preferred, unless explicitly stated otherwise.

The term "alkenyl" can include straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of very particularly preferred alkenyl groups are vinyl, 1E-propenyl, 1E-butenyl, 1E-pentenyl, 1E-hexenyl, 1E-heptenyl, 3E-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are preferred, unless explicitly stated otherwise.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "alkoxyalkyl" preferably covers straight-chain radicals of the formula $C_nH_{2n+1}$—O—$(CH_2)_m$, in which n and m are each, independent of one another, from 1 to 6. m is preferably 1 and n is preferably from 1 to 4.

Through a suitable choice of the meanings of $R^1$ to $R^{51}$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in short addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and smaller values of $k_{33}/k_{11}$ compared with alkyl and alkoxy radicals.

The optimum mixing ratio of the compounds of the formulae I and II+III+IV+V depends substantially on the desired properties, on the choice of the components of the formulae I, II, III, IV and/or V, and on the choice of any other components which may be present. Suitable mixing ratios within the range given above can easily be determined from case to case.

The total amount of compounds of the formulae I to V in the mixtures according to the invention is not crucial. The mixtures preferably include 50–90% by weight of compounds of the formulae I to V. The mixtures may also include one or more further components in order to optimize various properties. However, the observed effect, particularly on the level of the dielectric anisotropy, is generally greater the higher the total concentration of compounds of the formulae I to V, in particular of the formula I.

In a particularly preferred embodiment, the media according to the invention includes compounds of the formula III in which $X^3$ is $OCF_3$. A favorable synergistic effect with the compounds of the formulae I and II can result in particularly advantageous properties.

In addition to one or more compounds of the formula I, the liquid-crystalline media according to the invention preferably include from about 2 to about 35, in particular from about 4 to about 20, very particularly from about 5 to about 9, compounds as further constituents, not counting additives such as, for example, dyes and dopants. These media very particularly preferably include from about 7 to about 15 compounds in addition to one or more compounds of the formula I. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most desirable compounds suitable as further constituents of media according to the invention can be characterized by the formulae 1, 2, 3, 4 and 5:

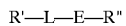 1

 2

 3

 4

 5

In the formulae 1, 2, 3, 4 and 5, L and E, which may be identical or different, are in each case, independent of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The media according to the invention preferably include one or more components selected from the compounds of the formulae 1, 2, 3, 4 and 5 in which L and E are selected from the group of Cyc, Phe or Pyr and simultaneously one or more components selected from the compounds of the formulae 1, 2, 3, 4 and 5 in which one of the radicals L and E is selected from the group of Cyc, Phe or Pyr and the other radical is selected from the group of -Phe-Phe-, -Phe-Cyc-, -Cyc-Cyc-, -G-Phe- or -G-Cyc-, and optionally one or more components selected from the compounds of the formulae 1, 2, 3, 4 and 5 in which the radicals L and E are selected from the group of -Phe-Cyc-, -Cyc-Cyc-, -G-Phe- or -G-Cyc-.

In a smaller sub-group of the compounds of the formulae 1, 2, 3, 4 and 5, R' and R" are each, independent of one another, alkyl, alkenyl, alkoxy, alkoxyalkyl, alkenyloxy or alkanoyloxy having up to 8 carbon atoms. This smaller sub-group is called group A below, and the compounds are denoted by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5 which is called group B, R" is desirably —F, —Cl, —NCS or —(O)$_i$CH$_{3-(k+1)}$F$_k$Cl$_1$, where i is 0 or 1, and k+1 is 1, 2 or 3; the compounds in which R" has this meaning are denoted by the sub-formulae 1b, 2b, 3b, 4b and 5b. Particular preference is given to compounds of the sub-formulae 1b, 2b, 3b, 4b and 5b in which R" is —F, —Cl, —NCS, —CF$_3$, —OCHF$_2$ or —OCF$_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is desirably —CN; this sub-group is called group C below, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a–5a and is preferably alkyl, alkoxy or alkenyl.

In addition to the preferred compounds from groups A, B and C, other compounds of the formulae 1, 2, 3, 4 and 5 having other variants of the proposed substituents may also be used. All these substances can be obtained by methods which are known from the literature or analogously thereto.

In addition to the compounds of the formula I, the media according to the invention preferably include one or more compounds selected from group A and/or group B and/or group C. The proportions by weight of the compounds from these groups in the media according to the invention are preferably Group A: from 0 to about 90%, preferably from about 20 to about 90%, in particular from about 30 to about 90%

Group B: from 0 to about 80%, preferably from about 10 to about 80%, in particular from about 10 to about 65%

Group C: from 0 to about 80%, preferably from about 5 to about 80%, in particular from about 5 to about 50%, the sum of the proportions by weight of the group A and/or B and/or C compounds present in the particular media according to the invention preferably being from about 5% to about 90% and in particular from about 10% to about 90%.

The media according to the invention preferably include from about 1 to about 40%, particularly preferably from about 5 to about 30%, of compounds of the formula I. The media preferably include two or more compounds of the formula I.

The construction of the IPS displays according to the invention corresponds to the usual design of displays of this type, as described, for example, in WO 91/10936 or EP 0 588 568. The term "conventional design" is broadly drawn here and also covers all derivatives and modifications of the IPS display, in particular, for example, also matrix display elements based on poly-Si TFT or MIM.

However, an essential difference between the displays according to the invention and the displays conventional hitherto lies in the choice of the liquid-crystal parameters of the liquid-crystal layer.

The liquid-crystal mixtures which can be used in accordance with the invention are prepared in a manner which is customary per se. In general, the desired amount of the components used in the smaller amount are dissolved in the components making up the principal constituent, advantageously at elevated temperature. It is also possible to prepare the mixtures in other conventional manners, for example by using pre-mixtures, for example homologous mixtures, or using so-called "multi-bottle" systems.

The dielectrics may also include further additives known to the person skilled in the art and described in the literature. For example, 0–about 15%, preferably 0–about 10%, of pleochroic dyes and/or chiral dopants can be added. The individual compounds added are employed in concentrations of from about 0.01 to about 6%, preferably from about 0.1 to about 3%. However, the concentration data for the other constituents of the liquid-crystal mixtures, i.e. the liquid-crystalline or mesogenic compounds, are given without taking into account the concentration of these additives.

Above and below,

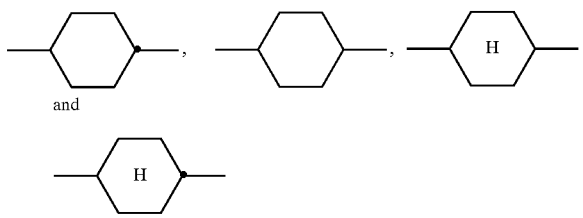

and denote trans-1,4-cyclohexylene.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure[s] of all applications, patents and publications, cited above or below, and of corresponding German application No. 19919978.7, filed Apr. 30, 1999, is hereby incorporated by reference.

EXAMPLES

The physical properties of the liquid-crystal mixtures are determined as described in "Physical Properties of Liquid Crystals", Ed. M. Becker, Merck KGaA, status November 1997, unless explicitly stated otherwise.

C denotes a crystalline phase, S a smectic phase, $S_C$ a smectic C phase, $S_B$ a smectic B phase, $S_A$ a smectic A phase, N a nematic phase and I the isotropic phase.

$V_0$ denotes the capacitive threshold voltage, $\Delta n$ denotes the optical anisotropy and $n_0$ the ordinary refractive index (in each case at about 589.3 nm). $\Delta \epsilon$ denotes the dielectric anisotropy ($\Delta \epsilon = \epsilon_\| - \epsilon_\perp$, where $\epsilon_\|$ denotes the dielectric constant parallel to the longitudinal molecular axes and $\epsilon_\perp$ denotes the dielectric constant perpendicular thereto, in each case at about 1 kHz). The electro-optical data were measured in a planar cell at about 20° C., unless expressly stated otherwise. All physical properties are quoted and measured at about 20° C., unless expressly stated otherwise. All concentration data are given as percent by weight, unless expressly stated otherwise.

The cells are preferably bright in the "off" state.

The following examples are intended to explain the invention without representing a limitation. Above and below, percentages are percent by weight. All temperatures are given in degrees Celsius. $\Delta n$ denotes the optical anisotropy (about 589.3 nm, about 20° C.), $\Delta \epsilon$ denotes the dielectric anisotropy (about 1 kHz, about 20° C.), H.R. denotes the voltage holding ratio (at about 100° C., after about 5 minutes in an oven at about 1 V), and $V_0$, the capacitive threshold voltage, was determined at about 20° C. and about 1 kHz.

The calibrated rotational viscometer gave a rotational viscosity for ZLI-4792 (Merck KGaA) of about 133 mPa·s at about 20° C.

The storage stability was investigated in sealed test cells with an optical retardation of about 0.5 μm using CU-1511 from DuPont, USA, as alignment layer. To this end, in each case 5 test cells were adhesively bonded on both sides to mutually crossed polarizers and stored at fixed temperatures of about 0° C., about –10° C., about –20° C., about –30° C. or about –40° C. The cells were assessed visually for changes at intervals of about 24 hours in each case. The storage time at the respective temperature $t_{store}(T)$ was noted as the final time at which none of the cells just exhibited no change.

In the present application and in the examples below, the structures of the liquid-crystal compounds are indicated by acronyms, the transformation into chemical formulae taking place as in Tables A and B below. All radicals $C_nH_{2n+1}$ and $C_mH_{2m+1}$ are straight-chain alkyl radicals having n or m carbon atoms respectively. The coding in Table B is self-evident. In Table A, only the acronym for the parent structure is given. In individual cases, the acronym for the parent structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nM | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nOF | $OC_nH_{2n+1}$ | F | H | H |
| nCl | $C_nH_{2n+1}$ | Cl | H | H |

| Code for $R^1$, $R^2$, $L^1$, $L^2$ | $R^1$ | $R^2$ | $L^1$ | $L^2$ |
|---|---|---|---|---|
| nF.F | $C_nH_{2n+1}$ | F | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| nVsN | $C_rH_{2r+1}$—CH=CH—$C_sH_{2s}$— | CN | H | H |
| nEsN | $C_rH_{2r+1}$—O—$C_2H_{2s}$— | CN | H | H |
| nAm | $C_nH_{2n+1}$ | COOC$_m$H$_{2m+1}$ | H | H |
| nF.F.F | $C_nH_{2n+1}$ | F | F | F |
| nCl.F.F | $C_nH_{2n+1}$ | Cl | F | F |
| nCF$_3$.F.F | $C_nH_{2n+1}$ | CF$_3$ | F | F |
| nOCF$_3$-F.F | $C_nH_{2n+1}$ | OCF$_3$ | F | F |
| nOCF$_2$-F.F | $C_nH_{2n+1}$ | OCHF$_2$ | F | F |
| nOCF$_3$-F | $C_nH_{2n+1}$ | OCF$_3$ | F | H |

Preferred displays contain media including, in particular, one or more compounds from Tables A and B in addition to the compounds of the formula I.

Particularly preferred IPS displays include media having one or more compounds of one of the formulae in Table A and one or more compounds of the formulae in Table B one or more compounds of each of two or more different types of compounds of the formulae in Table A one or more compounds of each of two or more different types of compounds of the formulae in Table B, or one or more compounds of each of four or more compounds from the group of compounds of the formulae in Tables A and B.

TABLE A

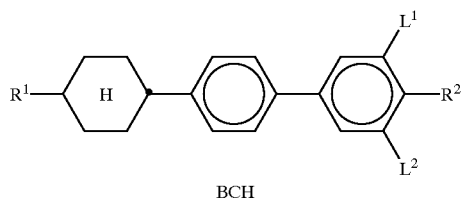

BCH

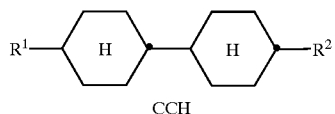

CCH

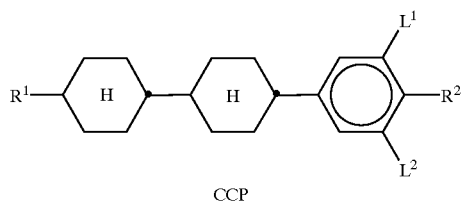

CCP

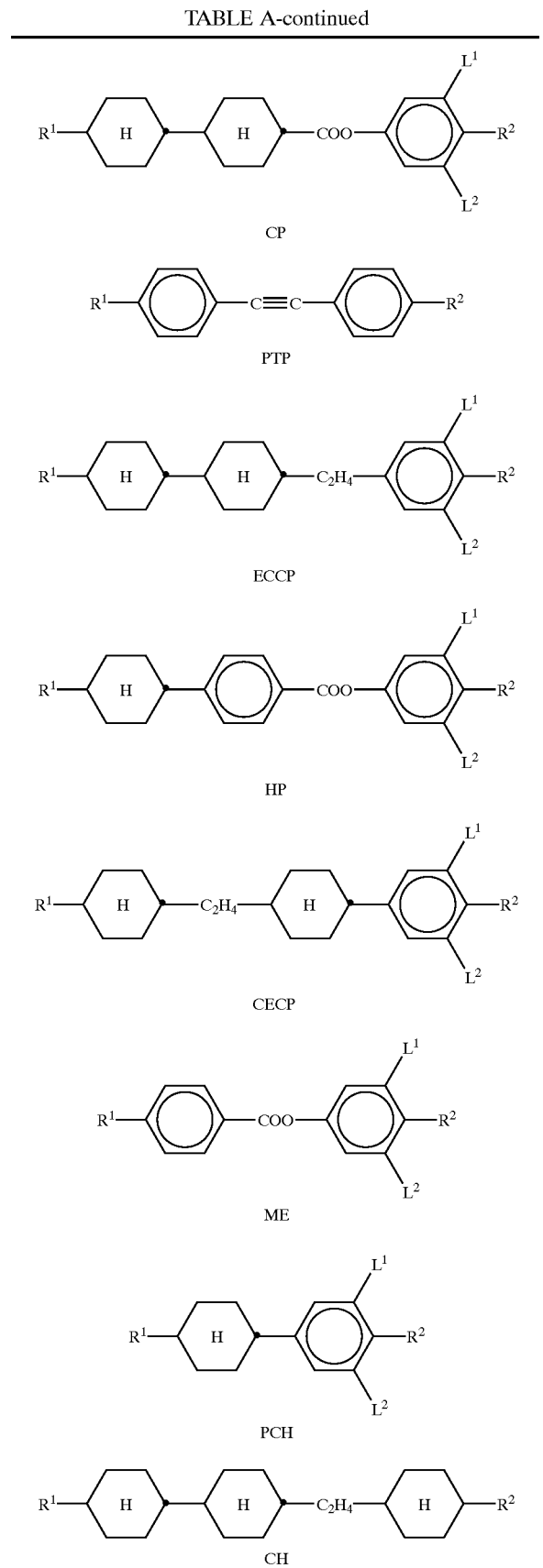

TABLE A-continued
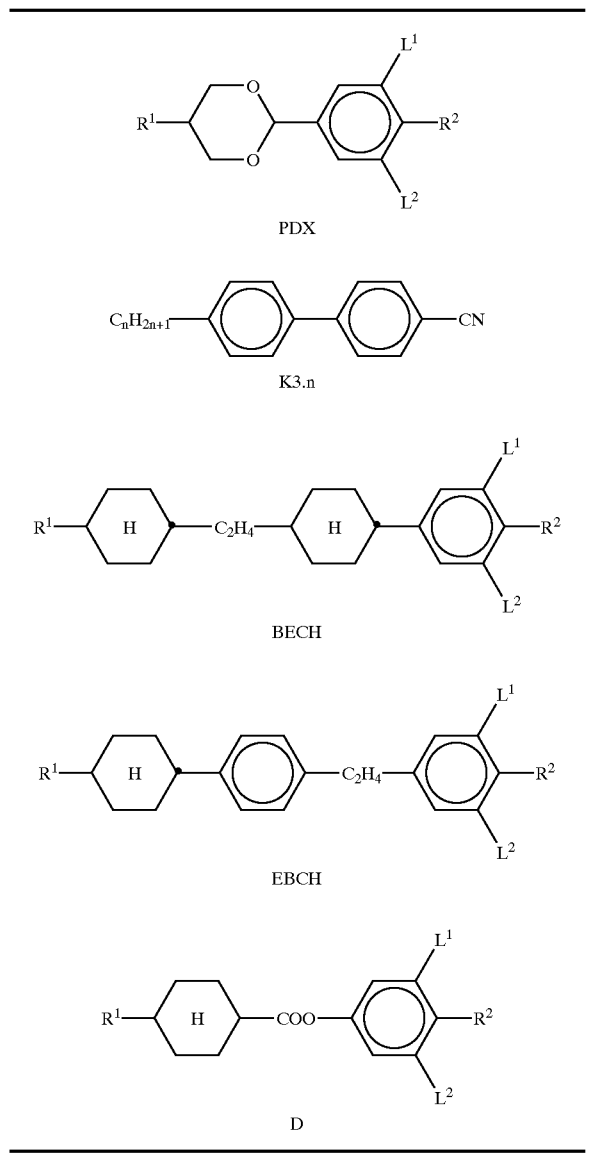
TABLE B
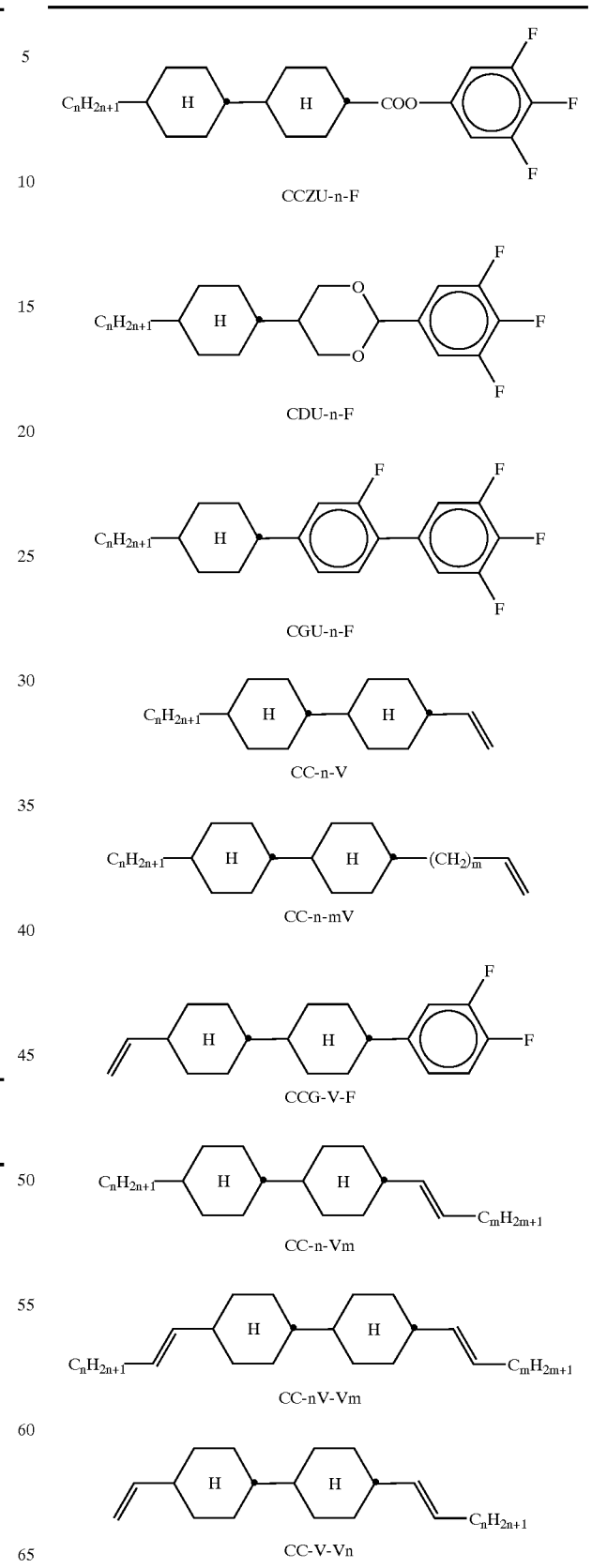

TABLE B-continued

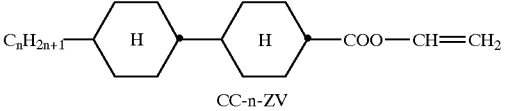

CC-n-ZV

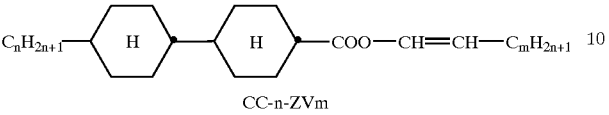

CC-n-ZVm

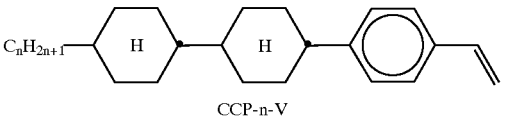

CCP-n-V

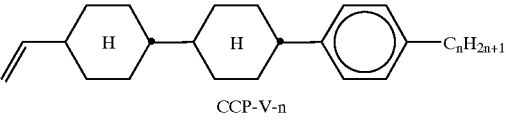

CCP-V-n

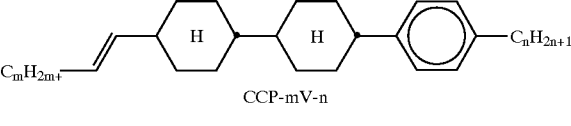

CCP-mV-n

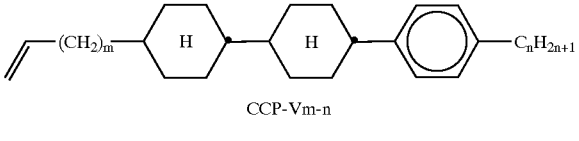

CCP-Vm-n

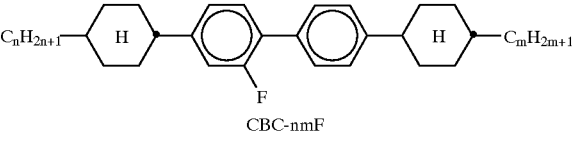

CBC-nmF

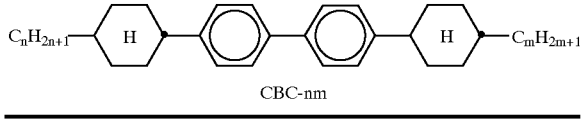

CBC-nm

EXAMPLES

The examples below are intended to illustrate the invention without restricting its scope in any way.

Example 1

An IPS display contains a nematic mixture having

| | |
|---|---|
| Clearing point: | 70.0° C. |
| T(S,N): | <−30° C. |
| Δn [589.3 nm, 20° C.]: | 0.0824 |
| Δε [1 kHz, 20° C.]: | 11.7 |
| $t_{store}$ [−30° C.]: | 1000 h | consisting of

| Compound | c/% by wt. |
|---|---|
| CCP-3OCF3 | 6.0 |
| CP-3OCF3 | 7.0 |
| CC-3-V1 | 10.0 |
| CC-5-V | 20.0 |
| PCH-3N.F.F | 16.5 |
| CCZU-2-F | 4.0 |
| CCZU-3-F | 13.5 |
| PCH-3O2 | 3.5 |
| ME2N.F | 2.0 |
| ME3N.F | 3.0 |
| ME4N.F | 3.0 |
| CCP-V-1 | 11.5 |
| Σ | 100.0 | and has good contrast.

Example 2

An IPS display contains a nematic liquid-crystal mixture having

| | |
|---|---|
| Clearing point: | 70.0° C. |
| T(S,N): | <−30° C. |
| Δn [589.3 nm, 20° C.]: | 0.0947 |
| Δε [1 kHz, 20° C.]: | 11.1 |
| $t_{store}$ [−30° C.]: | 1000 h | consisting of

| Compound | c/% by wt. |
|---|---|
| CC-5-V | 20.0 |
| CC-3-V1 | 10.5 |
| PCH-3O2 | 5.0 |
| PCH-3 | 11.5 |
| PCH-3N.F.F | 8.5 |
| ME2N.F | 2.5 |
| ME3N.F | 3.0 |
| ME4N.F | 8.0 |
| CP-3OCF3 | 6.0 |
| CP-5OCF3 | 5.0 |
| CCP-V-1 | 16.0 |
| CCP-V2-1 | 4.0 |
| Σ | 100.0 | and has excellent contrast.

Example 3

An IPS display contains a nematic mixture having

| | |
|---|---|
| Clearing point: | 70.0° C. |
| T(S,N): | <−30° C. |
| Δn [589.3 nm, 20° C.]: | 0.0943 |
| Δε [1 kHz, 20° C.]: | 11.6 |
| $γ_1$ [20° C.]: | 83 mPa·s |
| $t_{store}$ [−30° C.]: | 1000 h | consisting of

| Compound | concentration/% by wt. |
| --- | --- |
| CC-5-V | 20.0 |
| CC-3-V1 | 11.0 |
| PCH-3O2 | 3.5 |
| PCH-3 | 10.0 |
| PCH-3N.F.F | 10.0 |
| ME2N.F | 2.5 |
| ME3N.F | 3.0 |
| ME4N.F | 8.5 |
| CP-3OCF3 | 6.5 |
| CP-5OCF3 | 5.0 |
| CCP-V-1 | 16.0 |
| CCP-V2-1 | 4.0 |
| Σ | 100.0 | and has excellent contrast.

Example 4

An IPS display contains a nematic mixture having

| | |
| --- | --- |
| Clearing point: | 75.0° C. |
| T(S,N): | <−20° C. |
| Δn [589.3 nm, 20° C.]: | 0.1220 |
| Δε [1 kHz, 20° C.]: | 12.3 |
| $\gamma_1$ [20° C.]: | 101 mPa·s | consisting of

| Compound | c/% by wt. |
| --- | --- |
| PCH-3N.F.F | 7.0 |
| ME2N.F | 4.0 |
| ME3N.F | 4.0 |
| ME4N.F | 6.0 |
| K6 | 5.0 |
| K9 | 5.0 |
| K12 | 5.0 |
| CCP-V-1 | 16.0 |
| CCP-V2-1 | 16.0 |
| CC-5-V | 11.0 |
| CC-3-V1 | 9.5 |
| PCH-3O2 | 6.5 |
| BCH-32 | 3.5 |
| CBC-33F | 1.5 |
| Σ | 100.0 | and has excellent contrast.

Comparative Example 1

An IPS display contains the nematic mixture of Example 1 of DE 198 48 181 having

| | |
| --- | --- |
| Clearing point: | 62.5° C. |
| Δn [589.3 nm, 20° C.]: | 0.0966 |
| $n_o$ [589.3 nm, 20° C.]: | 1.4936 |
| Δε [1 kHz, 20° C.]: | 6.5 |
| $\varepsilon_\perp$ [1 kHz, 20° C.]: | 4.3 |
| $K_1$ [20° C.]: | 9.0 pN |
| $K_3/K_1$ [20° C.]: | 1.38 |
| $V_0$ [1 kHz, 20° C.]: | 1.24 V |
| Rotational visc., $\gamma_1$ [20° C.]: | 74 mPa·s |
| $t_{store}$ [−30° C.]: | 1000 h | consisting of

| Compound | c/% by wt. |
| --- | --- |
| CC-3-ZV | 25.0 |
| PCH-3O1 | 12.0 |
| PCH-2 | 12.0 |
| PCH-3N.F.F | 4.0 |
| ME2N.F | 5.0 |
| CCP-2OCF3 | 9.0 |
| BCH-2F.F | 6.0 |
| CCP-V-1 | 15.0 |
| BCH-32 | 6.0 |
| BCH-52 | 6.0 |
| Σ | 100.0 | and has adequate contrast.

The capacitive threshold $V_0$ (1 kHz; 20° C.) is 1.24 V.

Comparative Example 2

An IPS display contains the nematic mixture of Comparative Example 1 of DE 198 48 181 having

| | |
| --- | --- |
| Clearing point: | 67.5° C. |
| Δn [589.3 nm, 20° C.]: | 0.0942 |
| $n_o$ [589.3 nm, 20° C.]: | 1.4909 |
| Δε [1 kHz, 20° C.]: | 6.5 |
| $\varepsilon_\perp$ [1 kHz, 20° C.]: | 3.8 |
| $K_1$ [20° C.]: | 10.3 pN |
| $K_3/K_1$ [20° C.]: | 1.36 |
| $V_0$ [1 kHz, 20° C.]: | 1.33 V |
| $t_{store}$ [−30° C.]: | 1000 h | consisting of

| Compound | c/% by wt. |
| --- | --- |
| CC-5-V | 20.0 |
| CC-1V-V1 | 8.0 |
| CCH-34 | 4.0 |
| PCH-3O1 | 8.0 |
| PCH-2 | 15.0 |
| PCH-3N.F.F | 3.0 |
| ME2N.F | 5.0 |
| CCP-2OCF3 | 8.0 |
| BCH-2F.F | 5.0 |
| CCP-V-1 | 16.0 |
| BCH-32 | 4.0 |
| BCH-53 | 4.0 |
| Σ | 100.0 | and has at best adequate contrast.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An electro-optical liquid-crystal display comprising:

a re-alignment layer for re-aligning the liquid crystals, further comprising a field comprising a component;
a liquid-crystal layer for the re-alignment wherein the component is parallel to the liquid-crystal layer;
the liquid-crystal layer comprising a liquid-crystalline medium of positive dielectric anisotropy having a birefringence Δn of no more than about 0.12, comprising at least one compound of the formula I and at least one compound of the formula II or III

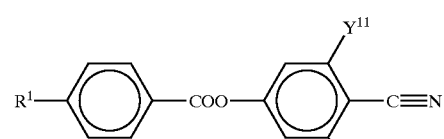

I

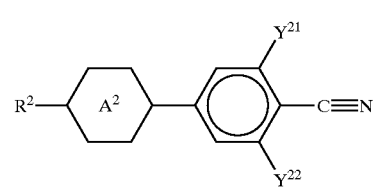

II

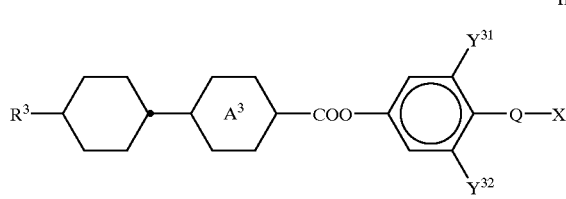

III in which
R$^1$, R$^2$ and R$^3$ are each, independent of one another, alkyl or alkoxy having 1 to 7 carbon atoms or alkenyl, alkenyloxy or alkoxyalkyl having 2 to 7 carbon atoms,
Y$^{21}$ is H or F,
Y$^{11}$, Y$^{12}$, Y$^{22}$, Y$^{31}$ and Y$^{32}$ are each, independent of one another, H or F,

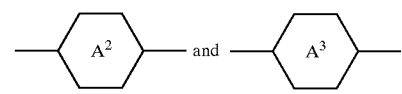

are each, independent of one another,

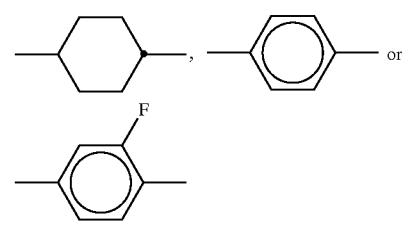

and

Q—X is F, Cl, —OCF$_2$H or —OCF$_3$, at least one compound of the formula Va:

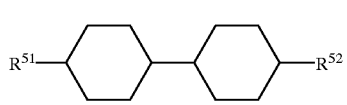

Va wherein at least one of the groups R$^{51}$ and R$^{52}$ is alkenyl and the other is alkyl or alkoxy having 1–7 carbon atoms or alkenyl, alkenyloxy or alkoxyalkyl having 2–7 carbon atoms;
at least one compound of the formula Vc

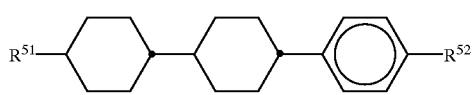

Vc wherein R$^{52}$ is n-alkyl having 1–5 carbon atoms and R$^{51}$ is 1E-alkenyl having 2–5 carbon atoms.

2. The liquid-crystal display according to claim 1, wherein the liquid-crystalline medium further comprises at least two compounds of the formula Ia

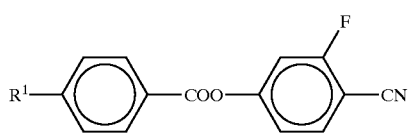

Ia in which R$^1$ is as defined under the formula I.

3. The liquid-crystal display according to claim 1, wherein the medium further comprises at least one compound of formula IIb or IIc

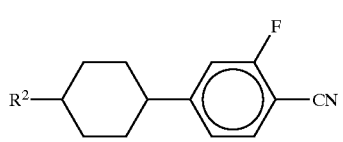

IIb

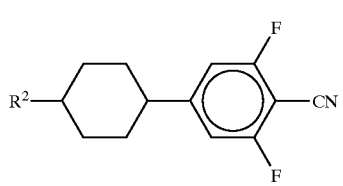

IIc in which R$^2$ is as defined above in claim 1 under the formula II.

4. The liquid-crystal display according to claim 1, wherein the medium further comprises at least one compound of the formula

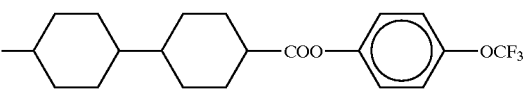

IIIa

-continued

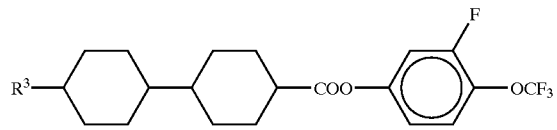
IIIb

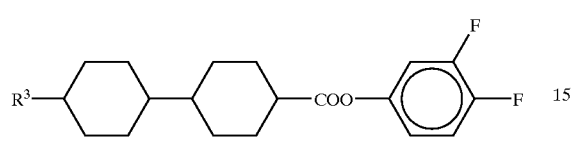
IIIc

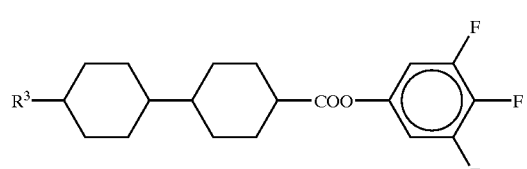
IIId

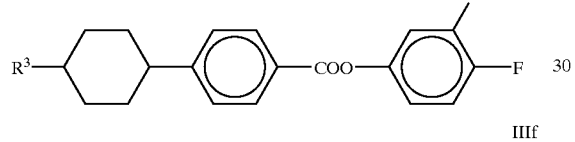
IIIe

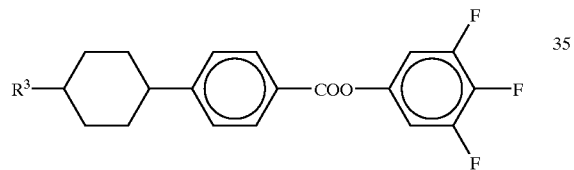
IIIf

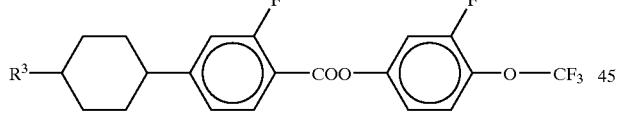
IIIg

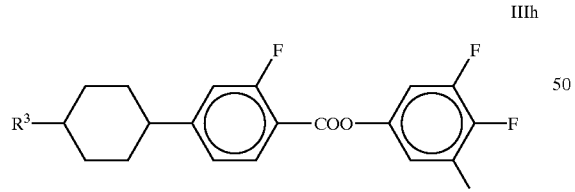
IIIh

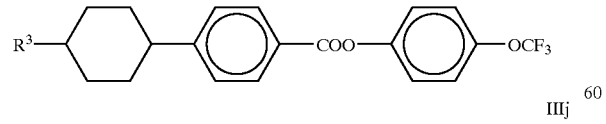
IIIi

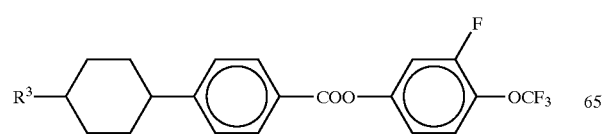
IIIj

-continued

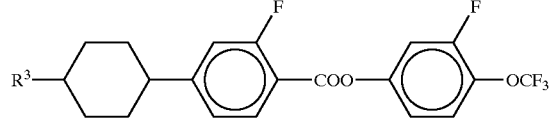
IIIk or

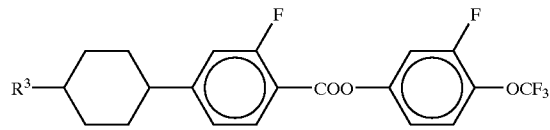
IIIl in which R³ is as defined for R¹ in claim 1 under the formula I.

5. The liquid-crystal display according to claim 1, wherein the medium comprises at least one compound of a formula IIIa:

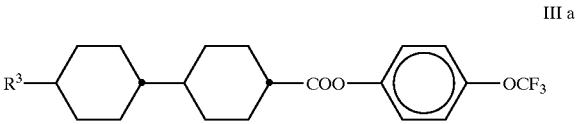
IIIa in which

R³ is alkyl or alkoxy having 1 to 7 carbon atoms or alkenyl, alkenyloxy or alkoxyalkyl having 2 to 7 carbon atoms.

6. The liquid crystal display according to claim 1, wherein the medium further comprises at least one compound of the formula IVa and/or one or more compounds of the formula IIId

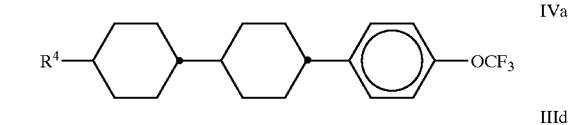
IVa

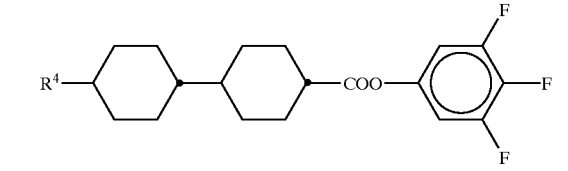
IIId in which R⁴ is in each case as defined for R¹ in claim 1, and/or at least one compound selected from the group of compounds of the formula Vb

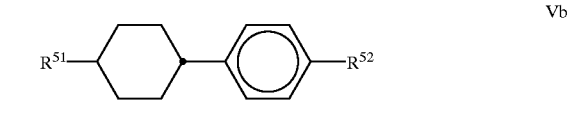
Vb in which

R⁵¹ and R⁵² are each, independent of one another, alkyl or alkoxy having 1 to 7 carbon atoms or alkenyl, alkenyloxy or alkoxyalkyl having 2 to 7 carbon atoms.

7. The liquid-crystal display according to claim 1, further comprising pixels are addressed by an active matrix.

8. A liquid-crystalline medium of positive dielectric anisotropy having a birefringence Δn of no more than 0.12 comprising at least one compound of the formula I and at least one compound of formula II or III

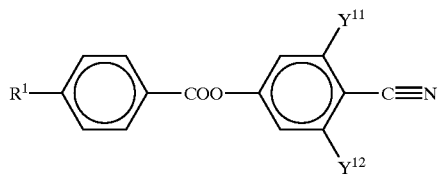   I

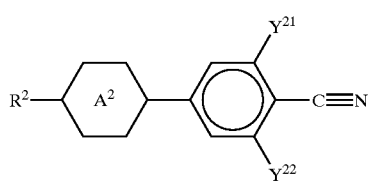   II

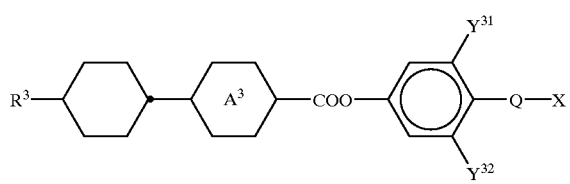   III in which $R^1$, $R^2$ and $R^3$ are each, independent of one another, alkyl or alkoxy having 1 to 7 carbon atoms or alkenyl, alkenyloxy or alkoxyalkyl having 2 to 7 carbon atoms, $Y^{11}$, $Y^{12}$, $Y^{21}$, $Y^{22}$, $Y^{31}$ and $Y^{32}$ are each, independent of one another, H or F,

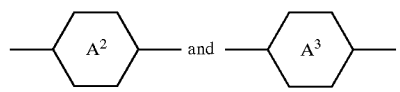

are each, independent of one another,

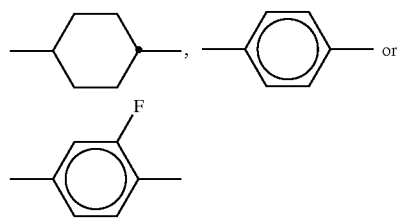

and

Q—X is F, Cl, —OCF$_2$H or —OCF$_3$;

and at least one compound of the formula:

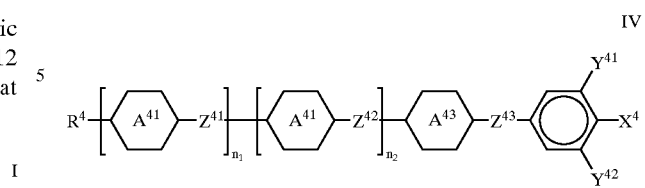   IV in which $R^4$ is H, an alkyl or alkenyl radical having 1 to 15 carbon atoms which is monosubstituted by CN or CF$_3$ and one or more CH$_2$ groups in these radicals are, independent of one another, replaceable by

—O—, —S—,

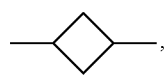

—CO—, —CO—O—, —O—CO—, —O—CO—O— or —C≡C— in such a way that O atoms are not linked directly to one another, $A^{41}$, $A^{42}$ and $A^{43}$ are each, independent of one another,
(a) a trans-1,4-cyclohexylene radical, in which, in addition, one or more non-adjacent CH$_2$ groups may be replaced by —O— and/or —S—,
(b) a 1,4-phenylene radical, in which, in addition, one or two CH groups may be replaced by N,
(c) a radical of 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, wherein the trans-1,4-cyclohexylene and 1,4-phenylene is, optionally, by at least one fluorine atom, $Z^{41}$, $Z^{42}$ and $Z^{43}$ are each, independent of one another, —CO—O—, —O—CO—, —CH$_2$O—, —OCH$_2$—, —CH$_2$CH$_2$—, —CH=CH—, —C≡C— or a single bond, or one of $Z^{41}$ and $Z^{42}$ is alternatively —(CH$_2$)$_4$— or —CH=CH—CH$_2$CH$_2$—, $X^4$ is F, —OCF$_2$H or —OCF$_3$, $Y^{41}$ and $Y^{42}$ are each, independent of one another, H or F, and $n_1$ and $n_2$ are each, independent of one another, 0 or 1; at least one compound of the formula Va:

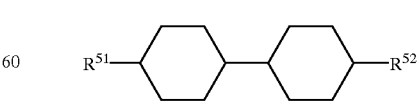   Va wherein at least one of the groups $R^{51}$ and $R^{52}$ is alkenyl and the other is alkyl or alkoxy having 1–7 carbon atoms or alkenyl, alkenyloxy or alkoxyalkyl having 2–7 carbon atoms;

at least one compound of the formula Vc

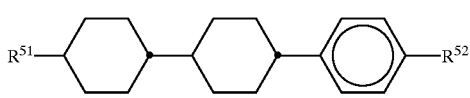

wherein $R^{52}$ is n-alkyl having 1–5 carbon atoms and $R^{51}$ is 1E-alkenyl having 2–5 carbon atoms.

9. A liquid-crystalline medium according to claim 8, wherein the medium comprises from about 3–about 35% by weight of at least two compounds of the formula I, from about 2–about 45% by weight of at least one compound of the formula II, from 0–about 25% by weight of at least one compound of the formula III, up to about 35% by weight of at least one compound of the formula IV, and from about 7–about 75% by weight of at least one compound of the formula Va and Vc

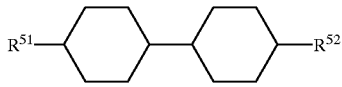

wherein at least one of the groups $R^{51}$ and $R^{52}$ is alkenyl and the other is alkyl or alkoxy having 1–7 carbon atoms or alkenyl, alkenyloxy or alkoxyalkyl having 2–7 carbon atoms;

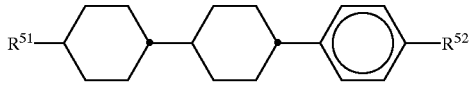

wherein $R^{52}$ is n-alkyl having 1–5 carbon atoms and $R^{51}$ is 1E-alkenyl having 2–5 carbon atoms.

10. A method of preparing a liquid-crystal display comprising incorporating the medium of claim 8.

11. The liquid-crystal display according to claim 1, wherein the liquid crystalline medium further comprises at least one compound of the formula IV

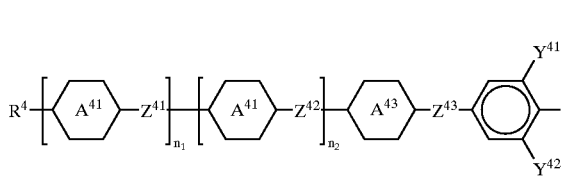

in which $R^4$ is H, an alkyl or alkenyl radical having 1 to 15 carbon atoms which is monosubstituted by CN, $CF_3$ or a halogen; and the $CH_2$ groups in these radicals are independent of one another and replaceable with —O—, —S—,

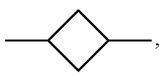

—CO—, —CO—O—, —O—CO—, —O—CO—O— or —C≡C— wherein the O atoms are not linked directly to one another, $A^{41}$, $A^{42}$ and $A^{43}$ are each, independent of one another,
(a) a trans-1,4-cyclohexylene, wherein one or more non-adjacent $CH_2$ groups are replaceable with —O— and/or —S—,
(b) a 1,4-phenylene, wherein one or two CH groups are replaceable with N,
(c) a compound of 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, wherein the trans-1,4-cyclohexylene and 1,4-phenylene is, optionally, substituted by at least one fluorine atom, $Z^{41}$, $Z^{42}$ and $Z^{43}$ are each, independent of one another, —CO—O—, —O—CO—, —$CH_2$O—, —O$CH_2$—, —$CH_2CH_2$—, —CH=CH—, —C≡C— or a single bond, or one of the compounds $Z^{41}$ and $Z^{42}$ is alternatively —$(CH_2)_4$— or —CH=CH—$CH_2CH_2$—, $X^4$ is F, —$OCF_2$H or —$OCF_3$, $Y^{41}$ and $Y^{42}$ are each, independent of one another, H or F, and $n_1$ and $n_2$ are each, independent of one another, 0 or 1.

12. The liquid-crystal display according to claim 1, wherein the liquid crystalline medium further comprises at least one compound of the formula V

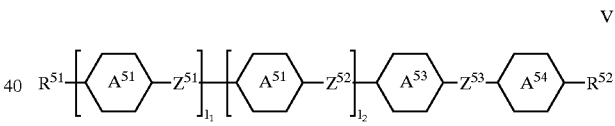

in which $R^{51}$ and $R^{52}$ are each, independent of one another, H, an alkyl or alkenyl radical having 1 to 15 carbon atoms which is monosubstituted by CN, $CF_3$ or a halogen; and the $CH_2$ groups in these radicals are independent of one another and replaceable with —O—, —S—,

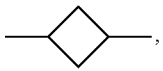

—CO—, —CO—O—, —O—CO—, —O—CO—O— or —C≡C— wherein the O atoms are not linked directly to one another, $A^{51}$, $A^{52}$, $A^{53}$, $A^{54}$ are each, independent of one another,
(a) a trans-1,4-cyclohexylene, wherein one or more non-adjacent $CH_2$ groups are replaceable with —O— and/or —S—,
(b) a 1,4-phenylene, wherein one or two CH groups are replaceable with N,
(c) a compound of 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, wherein the trans-1, 4-cyclohexylene and 1,4-phenylene is, optionally, substituted by at least one fluorine atom, $Z^{51}$, $Z^{52}$ and $Z^{53}$ are each, independent of one another, —CO—O—, —O—CO—, —CH$_2$O—, —OCH$_2$—, —CH$_2$CH$_2$—, —CH=CH—, —C≡C— or a single bond, or one of the compounds $Z^{41}$ and $Z^{42}$ is alternatively —(CH$_2$)$_4$— or —CH=CH—CH$_2$CH$_2$—, $l_1$ and $l_2$ are each 0 or 1.

13. The liquid display according to claim 1, wherein the liquid-crystalline medium further comprises at least one compound of the formula 1, 2, 3, 4, or 5

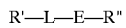  1

  2

  3

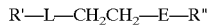  4

  5 where:

L and E are, independent of one another, a bivalent compound from the group of -Phe-, -Cyc-, -Phe-Phe-, -Phe-Cyc-, -Cyc-Cyc-, -Pyr-, -Dio-, -G-Phe- or -G-Cyc- and their mirror images, where Phe is unsubstituted or fluorine-substituted 1,4-phenylene, Cyc is trans-1,4-cyclohexylene or 1,4-cyclohexylene, Pyr is pyrimidine-2,5-diyl or pyridine-2,5-diyl, Dio is 1,3-dioxane-2,5-diyl and G is 2-(trans-1,4-cyclohexyl) ethyl, pyrimidine-2,5-diyl, pyridine-2,5-diyl or 1,3-dioxane-2,5-diyl, and R' and R" are each, independent of one another, alkyl, alkenyl, alkoxy, alkoxyalkyl, alkenyloxy or alkanoyloxy having up to 8 carbon atoms.

14. The liquid display according to claim 1, wherein the liquid-crystalline medium further comprises a compound selected from the group consisting of azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids.

15. The liquid display according to claim 1, wherein the liquid-crystalline medium further comprises a pleochroic dye or chiral dopant.

16. The liquid crystal display according to claim 1, wherein Δn is in the range 0.05–0.11.

17. The liquid crystal display according to claim 1, wherein Δn is in the range 0.07–0.10.

18. The liquid crystal display according to claim 1, wherein Δn is in the range 0.08–0.95.

19. The liquid crystal display according to claim 1, having a dielectric anisotropy (Δε) in the range 6.5–13.

20. The liquid crystal display according to claim 1, having a Δε of 6.5–12.

21. The liquid crystal display according to claim 1, having a Δε of 6.5–11.

22. The liquid crystal display according to claim 1, having a Δε of 7–13.

23. The liquid crystal display according to claim 1, having a Δε of 7–12.

24. The liquid crystal display according to claim 1, having a Δε of 7–11.

25. The liquid crystal display according to claim 1, having a Δε of 9–13.

26. The liquid crystal display according to claim 1, having a Δε of 9–12.

27. The liquid crystal display according to claim 1, having a Δε of 9–11.

28. The liquid crystal display according to claim 1, having a Δε of 7–25.

29. The liquid crystal display according to claim 1, having a Δε of greater than 6.5.

30. The liquid crystal display according to claim 1, having a Δε of 10–20.

31. The liquid crystal display according to claim 1, having a Δε of 11–13.

32. The liquid crystal display according to claim 1, wherein $Y^{21}$ is F.

33. The liquid crystal display according to claim 1, wherein both $Y^{21}$ and $Y^{22}$ are F.

34. A method according to claim 8, wherein $X^4$ is F or OCF$_3$.

* * * * *

UNITED STATES PATENT AND TRADEMARK OFFICE
CERTIFICATE OF CORRECTION

PATENT NO. : 6,602,562 B2
DATED : August 5, 2003
INVENTOR(S) : Shinji Nakajima et al.

It is certified that error appears in the above-identified patent and that said Letters Patent is hereby corrected as shown below:

<u>Title page,</u>
Item [73], Assignee, "Merck Patent Gesellschaft mit" should read -- Merck Patent Gesellschaft mit Beschränkter Haftung --.

<u>Column 28,</u>
Line 5, the formula should read:

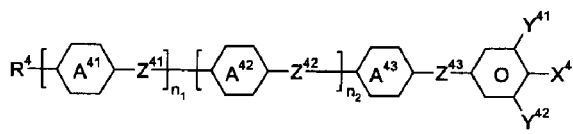

Line 42, "optionally, by" should read -- optionally, substituted by --.

<u>Column 29,</u>
Line 55, the formula should read:

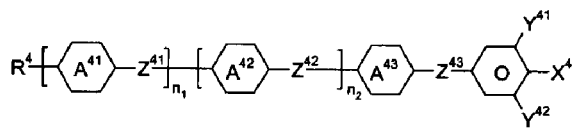

<u>Column 30,</u>
Line 40, the formula should read:

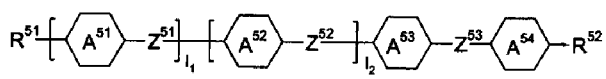

UNITED STATES PATENT AND TRADEMARK OFFICE
CERTIFICATE OF CORRECTION

PATENT NO. : 6,602,562 B2
DATED : August 5, 2003
INVENTOR(S) : Shinji Nakajima et al.

It is certified that error appears in the above-identified patent and that said Letters Patent is hereby corrected as shown below:

Column 32,
Line 5, "biphenylylethanes" should read -- biphenylethanes --.

Signed and Sealed this

Twenty-sixth Day of April, 2005

JON W. DUDAS
*Director of the United States Patent and Trademark Office*